Figure 1:
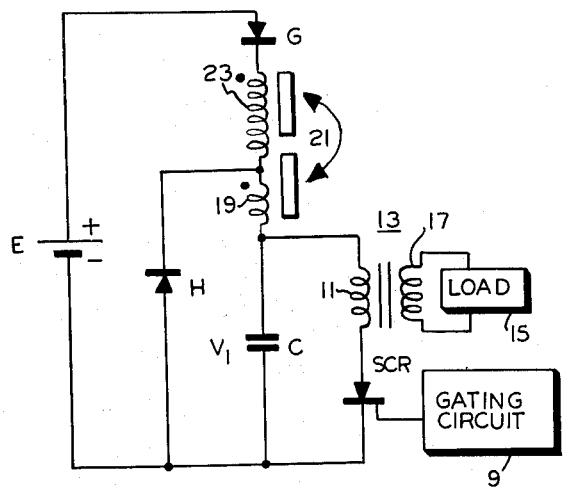

July 5, 1966 G. C. FETH 3,259,829
RESONANT CHARGING CIRCUIT CAPABLE OF PRODUCING AN OUTPUT
VOLTAGE WHICH IS HIGHER THAN THE INPUT VOLTAGE
Filed July 25, 1961

INVENTOR.
GEORGE C. FETH
BY
J T Comfort
ATTORNEY

United States Patent Office 3,259,829
Patented July 5, 1966

3,259,829
RESONANT CHARGING CIRCUIT CAPABLE OF PRODUCING AN OUTPUT VOLTAGE WHICH IS HIGHER THAN THE INPUT VOLTAGE
George C. Feth, Schenectady, N.Y., assignor to General Electric Company, a corporation of New York
Filed July 25, 1961, Ser. No. 126,665
3 Claims. (Cl. 321—15)

This invention relates to a charging circuit and more particularly to a resonant charging circuit.

In systems where only relatively low voltage sources such as chemical batteries, fuel cells, photovoltaic or thermoelectric cells, or thermionic converters are available it is desirable to charge a capacitor in a charging circuit to a voltage greater than that of the prime voltage source. Thus, more energy can be stored in a given volume or weight of capacitor, and for a given stored energy requirement the circuit design may be optimized by reducing the current levels, the consequent losses and the cooling requirements.

Heretofore charging circuits have been used wherein the capacitor has been charged through a resistor. In such circuits a sizeable fraction of the energy drawn from the source is dissipated in the resistor and if the capacitor is initially charged negatively even more energy is drawn from the source and dissipated in the resistor with no increase of stored energy in the capacitor, but with a longer time required to obtain a given voltage. The voltage to which the capacitor can be charged in this manner is limited to the source voltage.

Higher efficiency resonant charging circuits have been used, wherein the charging current flows through an inductance to the capacitor. A capacitor initially charged to a negative voltage equal in magnitude to the source voltage can be charged to a peak voltage as much as twice the source voltage. However, in such a circuit the resonance charging current must flow through the source drawing considerable energy from the source, and consequently is inefficient.

It is therefore an object of this invention to provide a new and improved resonant charging circuit.

Another object of this invention is to provide a new and improved resonant charging circuit for charging a capacitor to a higher voltage than that of the source voltage.

Yet another object of this invention is to provide a new and improved resonant charging circuit capable of producing a voltage higher than that of the voltage source.

Another object of this invention is to provide a new and improved resonant charging circuit more efficient than previous resonant charging circuits.

In accordance with the principles of this invention a resonant charging circuit is provided with potential source and a capacitor connected to charge the capacitor to a first potential. A first resonant circuit includes the capacitor. Control means initiate conduction in the first resonant circuit to discharge the capacitor and recharge the capacitor to a second potential opposite in polarity to the first potential. A bypass resonant circuit including the capacitor is operative when the capacitor is charged to the second potential to discharge the capacitor and to recharge the capacitor to a third potential. The capacitor is then connected to the potential source to further charge the capacitor to a fourth potential substantially twice the magnitude of the source potential.

Such a charging circuit charges the capacitor to a voltage higher than that of the source and is efficient.

The novel features of the invention are set forth with particularity in the appended claims. The invention itself, however, both as to its organization and method of operation, together with further objects and advantages thereof, may best be understood by referring to the following description and the accompanying drawings.

Figure 2:
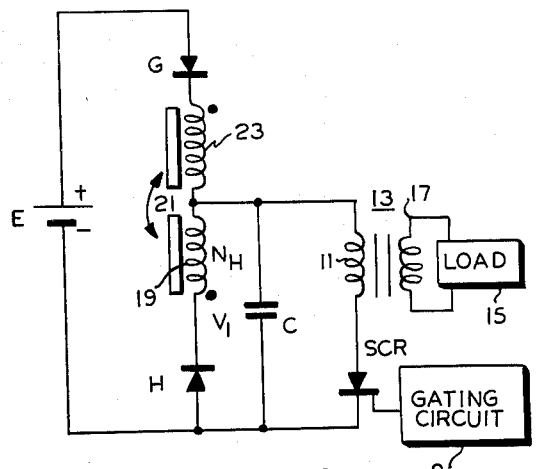

In the drawings:
FIG. 1 is a schematic of a resonant charging circuit embodying the principles of this invention.
FIG. 2 is a schematic of a resonant charging circuit which is a modification.

Referring now to FIG. 1 capacitor C is charged through the inductance of windings 23 and 19 of transformer 21 from voltage source E to a voltage approximately twice the voltage of voltage source E or 2e. Capacitor C is charged to 2e because of the resonance between the capacitor C and the inductance of windings 19 and 23 of transformer 21. Rectifier G prevents discharge of the capacitor C back into the source. Rectifier H is back biased and silicon controlled rectifier SCR is turned off preventing discharge of the capacitor through winding 11.

After capacitor C is charged to 2e, gating circuit 9 is activated to gate on silicon controlled rectifier SCR. Capacitor C then discharges and current flows through the primary winding 11 of transformer 13 and the silicon controlled rectifier SCR to apply a voltage to load 15 through the secondary winding 17 of transformer 13.

The gating on of the silicon controlled rectifier SCR and the flow of current through the inductance of the winding 11 initiates a resonant half cycle between the winding 11 and capacitor C, and in the resulting resonant half cycle capacitor C becomes negatively charged to a voltage opposite in polarity to the original positive voltage in capacitor C before discharge. The negative voltage in capacitor C commutates the silicon controlled rectifier SCR, the cathode eventually becoming positive with respect to the anode and the silicon controlled rectifier SCR being turned off.

After capacitor C is negatively charged and the silicon controlled rectifier SCR is turned off, rectifier H becomes forward biased and capacitor C begins a resonant half cycle with winding 19 of transformer 21. As current flows through the pirmary winding 19 of transformer 21 voltage is induced in the secondary winding 23 which exceeds the voltage of the source E and back biases rectifier G so no current flows through the source E.

Capacitor C is recharged during the resonant half cycle with winding 19 as current flows through the bypass circuit provided by forward biased rectifier H and energy is transferred from the capacitor C to the transformer 21. Capacitor C is charged to a less negative voltage and the voltage in secondary winding 23 decreases until finally rectifier G is forward biased again and charging current flows from source E. Rectifier H is back biased as rectifier G begins to conduct. Capacitor C is now charged from the source and the stored energy of transformer 21 until the stored energy of the transformer has been reduced to zero. At this time capacitor C has been charged to approximately twice the voltage of the source or 2e.

The period of the resonant half cycle with the winding 11 and the capacitor C should be shorter than that with winding 19 and the capacitor C, so that as the capacitor C begins to recharge through winding 11 the rate of discharge through winding 19 is not excessive and capacitor C is charged to a large enough negative voltage to commutate the silicon controlled rectifier SCR.

After capacitor C is charged the cycle as described may be repeated with the gating on of silicon controlled rectifier SCR to apply a voltage of approximately 2e to the load 15, and the recharging of the capacitor C repeated as described above.

If there were no losses in the charging circuit, it can be seen that the voltage would build up indefinitely; however, normal losses occur and the average voltage capacitor C is charged to is approximately 2e or twice the source voltage.

FIG. 2 shows a resonant charging circuit in which the charging current from the source does not pass through the primary winding 19 of transformer 21. The circuit operates in a similar manner to the circuit described in FIG. 1 and need not be further described.

The choice of the turns ratio $W23/W19$ in transformer 21 is determined as a practical matter by the peak inverse voltage of rectifier G and by the voltage at which rectifier should begin to conduct. In the particular embodiments shown the turns ratio $W23/W19$ is 4

Gating circuit 9 may be a standard circuit designed to generate a plurality of standard size pulses sufficient to fire silicon controlled rectifier SCR. The gating circuit 9 should be adjusted to allow sufficient time between pulses to allow capacitor C to be fully charged.

Load 15 may be any load requiring a higher voltage signal than is provided by source E.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. A resonant charging circuit for applying a voltage to a load comprising a potential source, a capacitor, switching means normally connecting said potential source to said capacitor to charge said capacitor to a first potential, a controlled rectifier, a transformer having a primary and secondary winding, the secondary winding of said transformer connected to said load, said controlled rectifier and the primary winding of said transformer connected in series with said capacitor, gating means for gating on said controlled rectifier to discharge said capacitor through the primary winding of said transformer to cause a voltage to be applied to said load through the secondary winding of said transformer, and to cause said capacitor to be recharged to a second potential opposite in polarity to said first potential, and a bypass resonant circuit including said capacitor operative when said capacitor is charged to said second potential to discharge said capacitor and recharge said capacitor to a third potential, said switching means operative when said capacitor is being charged to said third potential to disconnect said potential source from said capacitor and operative after said capacitor is charged to said third potential to connect said potential source to said capacitor to charge said capacitor to a fourth potential.

2. A resonant charging circuit comprising a potential source, a capacitor, a rectifier, a transformer having a primary and a secondary winding means connecting said capacitor in series with said potential source through the primary and secondary windings of said transformer and said rectifier to charge said capacitor to a first potential, a first resonant circuit including said capacitor, means for initiating conduction in said first resonant circuit to discharge said capacitor and recharge said capacitor to a second potential opposite in polarity to said first potential, a bypass resonant circuit including said capacitor and the primary winding of said transformer operative when said capacitor is charged to said second potential to discharge said capacitor and to recharge said capacitor to a third potential, and means including said transformer and said rectifier responsive to the charging of said capacitor to said third potential to back bias said rectifier to prevent current flow from said potential source and operative when said capacitor is charged to said third potential to forward bias said rectifier to charge said capacitor from said potential source to a fourth potential.

3. A resonant charging circuit for applying a voltage to a load comprising a potential source, a capacitor, a rectifier, a first transformer having a primary and a secondary winding, means connecting said capacitor in series with said potential source through the primary and secondary windings of said first transformer and said rectifier to charge said capacitor to a first potential, a silicon controlled rectifier, a second transformer having a primary and a secondary winding, the secondary winding of said second transformer connected to said load, said silicon controlled rectifier and the primary winding of said second transformer connected in series with said capacitor, gating means for gating on said silicon controlled rectifier to discharge said capacitor through the primary winding of said second transformer to cause a voltage to be applied to said load through the secondary winding of said second transformer and to cause said capacitor to be recharged to a second potential opposite in polarity to said first potential, a bypass resonant circuit including said capacitor and the primary winding of said transformer operative when said capacitor is charged to said second potential to discharge said capacitor and to recharge said capacitor to a third potential, and means including the primary and secondary of said first transformer responsive to the charging of said capacitor to said third potential to back bias said rectifier to prevent current flow from said potential source and operative when said capacitor is charged to said third potential to forward bias said rectifier to charge said capacitor from said potential source to a fourth potential.

References Cited by the Examiner
UNITED STATES PATENTS

| | | | |
|---|---|---|---|
| 2,214,871 | 9/1940 | Westendorp | 321—15 |
| 2,555,305 | 6/1951 | Alty | 321—45 |

FOREIGN PATENTS 76,720  11/1953  Denmark.

JOHN F. COUCH, *Primary Examiner.*

SAMUEL BERNSTEIN, LLOYD McCOLLUM,
*Examiners.*

G. J. BUDOCK, G. GOLDBERG, *Assistant Examiners.*